(12) United States Patent
Kim et al.

(10) Patent No.: US 11,648,169 B2
(45) Date of Patent: May 16, 2023

(54) WEARABLE APPARATUS FOR ASSISTING MUSCULAR STRENGTH

(71) Applicants: HYUNDAI MOTOR COMPANY, Seoul (KR); KIA MOTORS CORPORATION, Seoul (KR)

(72) Inventors: Beom Su Kim, Yongin-si (KR); Sang In Park, Suwon-si (KR); Seung Kyu Nam, Seoul (KR); Dong Jin Hyun, Suwon-si (KR); Ju Young Yoon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 588 days.

(21) Appl. No.: 16/898,868

(22) Filed: Jun. 11, 2020

(65) Prior Publication Data
US 2021/0161748 A1 Jun. 3, 2021

(30) Foreign Application Priority Data
Dec. 3, 2019 (KR) .................. 10-2019-0159254

(51) Int. Cl.
*A61H 1/00* (2006.01)
*A61H 1/02* (2006.01)

(52) U.S. Cl.
CPC ......... *A61H 1/0281* (2013.01); *A61H 1/0277* (2013.01); *A61H 1/0285* (2013.01); *A61H 2201/165* (2013.01); *A61H 2201/1635* (2013.01); *A61H 2201/1659* (2013.01); *A61H 2201/1673* (2013.01)

(58) Field of Classification Search
CPC .. A61H 1/0281; A61H 1/0277; A61H 1/0285; A61H 2201/1635; A61H 2201/165; A61H 2201/1659; A61H 2201/1673; A61H 1/00; A61H 2001/0203; A61H 1/0274; B25J 9/0006
USPC .......................................................... 601/33
See application file for complete search history.

(56) References Cited

U.S. PATENT DOCUMENTS

2013/0237883 A1* 9/2013 Malosio ............... A61H 1/0281
601/33

FOREIGN PATENT DOCUMENTS

KR        10-1896181 B1     9/2018

* cited by examiner

*Primary Examiner* — Philip R Wiest
*Assistant Examiner* — Sarah B Lederer
(74) *Attorney, Agent, or Firm* — McDonnell Boehnen Hulbert & Berghoff LLP

(57) ABSTRACT

Provided is a wearable apparatus for assisting muscular strength including a first rotary member, a first side of which is located at an upper portion of a shoulder of a wearer and a second side of which is located at a back thereof, a second rotary member, a first side of which is coupled to the second side of the first rotary member and a second side of which moves upward and downward, a first connecting part, a first side of which is coupled to the second side of the second rotary member, and a second side of which is located at an outer side surface of the wearer, a third rotary member, a first side of which is coupled to the second side of the first connecting part, and a fourth rotary member, a first side of which is coupled to the second side of the third rotary member.

16 Claims, 6 Drawing Sheets

WEARABLE APPARATUS FOR ASSISTING MUSCULAR STRENGTH

CROSS REFERENCE TO RELATED APPLICATIONS

The present application claims priority to Korean Patent Application No. 10-2019-0159254, filed Dec. 3, 2019, the entire contents of which is incorporated herein for all purposes by this reference.

BACKGROUND

Field

The present disclosure relates to a wearable apparatus for assisting muscular strength. More particularly, the present disclosure relates to an apparatus which is worn on the upper limbs of a human body to assist the muscular strength of the upper limbs by simulating a shoulder movement.

Description of the Related Art

A wearable robot is a robot that is worn on a specific region of a body or holds a specific region to assist the motion of the body, and is designed for medical, military, or work purposes. Especially in the case of the wearable robot for work purposes, the robot is designed to prevent injury and assist muscular strength by reducing load imposed on a worker. Such a wearable robot simulates a wearer's skeleton, and the key technology for the robot is to design joints so that they have the same motion as the actual motion of the body.

In particular, a wearable instrument for assisting the muscular strength of upper arms includes a manual support device configured to assist a person who supports the weight of a tool. A typical manual apparatus is configured to compensate for gravity under a range of locations using a combination of structural elements, springs, cables, and pulleys. The configuration of these devices compensates for gravity within a limited operating range.

However, the conventional wearable instrument for assisting the muscular strength of the upper arms is problematic in that it is difficult to properly simulate the motion of the wearer by failing to overcome the limit of a skeleton device. In particular, it is difficult to accurately simulate the movement of the scapula during the wearer's shoulder motion.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose an apparatus which assists the muscular strength of the upper limbs of a wearer by properly simulating the joint motion of the wearer's shoulder.

In order to achieve the above object, according to one aspect of the present disclosure, there is provided a wearable apparatus for assisting muscular strength, the wearable apparatus including: a first rotary member, a first side of which is located at an upper portion of a shoulder of a wearer, which bends downward while extending in a rear direction of the wearer, and a second side of which is located at a back of the wearer; a second rotary member, a second side of which moves upward and downward during rotation of the second rotary member relative to the first side thereof, a first connecting part, a first side of which is coupled to the second side of the second rotary member to be rotatable relative to a second rotating axis extending in the extending direction of the upper arm of the wearer, and a second side of which is located at an outer side surface of the wearer by extending in a direction of a plane intersecting with the second rotating axis, a third rotary member, a first side of which is coupled to the second side of the first connecting part to be rotatable relative to a third rotating axis extending in a direction parallel with the second rotating axis, the third rotary member extending along the extending direction of the upper arm from the outer side surface of the wearer, and a fourth rotary member, a first side of which is coupled to the second side of the third rotary member to be rotatable relative to a fourth rotating axis extending in a direction intersecting with an outer side surface of the upper arm of the wearer, the fourth rotary member extending in an extending direction of a forearm of the wearer and being coupled to the upper arm, the forearm, or a hand of the wearer.

The wearable apparatus may further include a fixing member located at the back of the wearer and extending in the upward and downward directions, and a second connecting part coupled to each of a first side of the fixing member and the first side of the first rotary member to be rotatable relative to each of a fifth rotating axis and a sixth rotating axis extending in the upward and downward directions at the first side of the fixing member and the first side of the first rotary member, respectively.

The fixing member may be configured to be slidable between the first side and the second side thereof in the upward and downward directions.

The first rotary member may be coupled to the fixing member via the second connecting part to be rotatable relative to the fixing member, a rotation center of the first rotary member being located to be spaced apart forward from the fixing member or the fifth rotating axis.

The second connecting part may include a first connecting member rotatably coupled to the first side of the fixing member and extending laterally, and a second connecting member rotatably coupled to each of the first connecting member and the first side of the first rotary member and extending forward.

The second connecting member may extend to be longer than the first connecting member.

The second connecting part may further include a third connecting member rotatably coupled to the first side of the first rotary member at a position spaced apart from the second connecting member and extending in parallel with the second connecting member, and a fourth connecting member coupled to the first side of the fixing member at a position spaced apart from the first connecting member and extending in parallel with the first connecting member, the fourth connecting member being rotatably coupled to each of the second connecting member and the third connecting member.

The third rotary member may be coupled to the second rotary member via the first connecting part to be rotatable relative to the second rotary member, a rotation center of the third rotary member being located to be spaced apart forward from the second rotary member or the second rotating axis.

The first connecting part may include a fifth connecting member rotatably coupled to the second side of the second rotary member and extending from a rear surface of the upper arm of the wearer, and a sixth connecting member rotatably coupled to each of the fifth connecting member and the first side of the third rotary member and extending forward.

The sixth connecting member may extend to be longer than the fifth connecting member.

The first connecting part may further include a seventh connecting member rotatably coupled to the first side of the third rotary member at a position spaced apart from the sixth connecting member and extending in parallel with the sixth connecting member, and an eighth connecting member coupled to the second side of the second rotary member at a position spaced apart from the fifth connecting member and extending in parallel with the fifth connecting member, the eighth connecting member being rotatably coupled to each of the sixth connecting member and the seventh connecting member.

The third rotary member may be configured to be slidable in a longitudinal direction extending between the first side and the second side thereof.

The fourth rotary member may be configured to be slidable in a longitudinal direction extending between the first side and the second side thereof.

A grip part configured to be gripped by the hand of the wearer may be provided in the fourth rotary member, so that the wearer is connected to the fourth rotary member by gripping the grip part.

The grip part may be coupled to a second side of the fourth rotary member to be rotatable relative to a seventh rotating axis extending in an extending direction of the fourth rotary member.

According to the wearable apparatus for assisting muscular strength of the present disclosure, the limit of a skeleton device is overcome, and the rotation center of a skeleton member corresponds to the rotation center of the wear's joint.

In addition, the wearable apparatus of the present disclosure naturally simulates the joint motion of the wearer's shoulder, thereby minimizing the feeling of awkwardness of the wearer.

BRIEF DESCRIPTION OF THE FIGURES

The above and other objects, features and other advantages of the present disclosure will be more clearly understood from the following detailed description when taken in conjunction with the accompanying drawings, in which.

DETAILED DESCRIPTION

Figure 1:
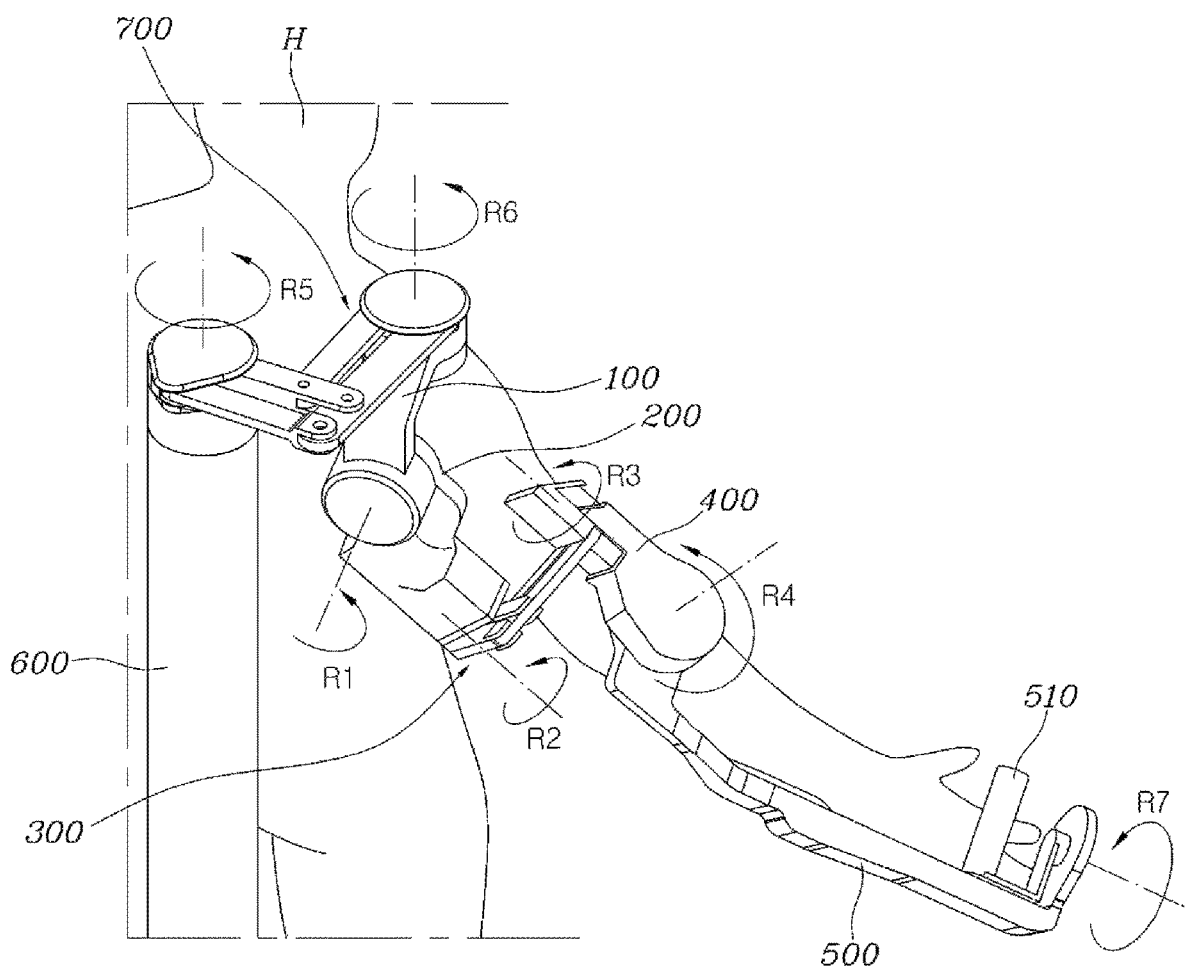
FIG. 1 is a rear perspective view illustrating a wearable apparatus for assisting muscular strength according to an embodiment of the present disclosure.

Specific structural or functional descriptions in the embodiment of the present disclosure introduced in this specification or application are only for description of the embodiment of the present disclosure. The descriptions should not be construed as being limited to the embodiment described in the specification or application.

The present disclosure may, however, be embodied in many different forms and should not be construed as being limited to only the embodiment set forth herein, but should be construed as covering modifications, equivalents, or alternatives falling within ideas and technical scopes of the present disclosure. However, it is to be understood that the present description is not intended to limit the present disclosure to the exemplary embodiment, and the present disclosure is intended to cover not only the exemplary embodiment, but also various alternatives, modifications, equivalents, and other embodiments that fall within the spirit and scope of the present disclosure.

It will be understood that, although the terms "first", "second", etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing the particular embodiment only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Hereinafter, the present disclosure will be explained in detail by describing the exemplary embodiment of the present disclosure with reference to the accompanying drawings. The same reference numerals are used throughout the drawings to designate the same or similar components.

FIG. 1 is a rear perspective view showing a wearable apparatus for assisting muscular strength according to the embodiment of the present disclosure.

Referring to FIG. 1, the wearable apparatus for assisting muscular strength according to the embodiment of the present disclosure includes a first rotary member 100, a first side of which is located at an upper portion of a shoulder of a wearer H, which bends downward while extending in a rear direction of the wearer H, and a second side of which is located at a back of the wearer H; a second rotary member 200, a first side of which is coupled to the second side of the first rotary member 100 to be rotatable relative to a first rotating axis R1 extending from the back of the wearer H toward the wearer H, extending along an extending direction of an upper arm of the wearer H, and a second side of which moves upward and downward during rotation of the second rotary member relative to the first side thereof; a first connecting part 300, a first side of which is coupled to the second side of the second rotary member 200 to be rotatable relative to a second rotating axis R2 extending in the extending direction of the upper arm of the wearer H, and a second side of which is located at an outer side surface of the wearer H by extending in a direction of a plane intersecting with the second rotating axis R2; a third rotary member 400, a first side of which is coupled to the second side of the first connecting part 300 to be rotatable relative to a third rotating axis R3 extending in a direction parallel with the second rotating axis R2, the third rotary member extending along the extending direction of the upper arm from the outer side surface of the wearer H; and a fourth rotary member 500, a first side of which is coupled to the second side of the third rotary member 400 to be rotatable relative to a fourth rotating axis R4 extending in a direction intersecting with an outer side surface of the upper arm of the wearer H, the fourth rotary member extending in an extending direction of a forearm of the wearer H and being coupled to the upper arm, the forearm, or a hand of the wearer H.

The wearable apparatus of the present disclosure may further include: a fixing member 600 located at the back of the wearer H and extending in the upward and downward directions; and a second connecting part 700 coupled to a first side of the fixing member 600 and the first side of the first rotary member 100 to be rotatable relative to each of a fifth rotating axis R5 and a sixth rotating axis R6 extending in the upward and downward directions at the first side of the fixing member 600 and the first side of the first rotary member 100, respectively.

The fixing member 600 may extend in the upward and downward directions to correspond to the spine of the wearer H. The second side of the fixing member 600 according to the embodiment may be fixed to the ground or a fixture by being combined therewith.

According to another embodiment, the fixing member 600 may be fixed to the body of the wearer H by a separate harness. For example, the fixing member 600 may be fixed to the back of the wearer H by a waist harness surrounding the waist of the wearer H and a shoulder harness surrounding the wearer's shoulder.

The first rotary member 100 is coupled to the fixing member 600 via the second connecting part 700. Particularly, the first rotary member 100 can rotate relative to the first side of the fixing member 600 via the second connecting part 700. The first rotary member 100 can rotate relative to the fixing member 600 while rotating on its axis.

The first side of the first rotary member 100 is located at an upper portion of the shoulder of the wearer H, and particularly, may be located at an upper portion of the rotation center of the upper arm of the wearer H rotating relative to the shoulder. The rotation center of the upper arm of the wearer H rotating relative to the shoulder may be located at the rotation axis (the sixth rotating axis R6) of the first rotary member 100 rotating relative to the second side of the second connecting part 700.

The first rotary member 100 extends to the rear of the wearer H and bends downward such that the first rotary member is coupled to the back from the upper portion of the shoulder of the wearer H. The first rotary member 100 surrounds the shoulder of the wearer H between the first side and the second side of the first rotary member at the upper surface and the back of the shoulder.

Particularly, the second side of the first rotary member 100 may extend in a direction of a plane parallel with the back of the wearer H, and the first rotary member 100 may be bent perpendicularly such that the rotation axis (the sixth rotating axis R6) of the first rotary member 100 rotating relative to the second connecting part 700 and the rotation axis of the second rotary member 200 rotating relative to the second side of the first rotary member 100 are perpendicular to each other.

The second rotary member 200 may extend in a direction of a plane parallel to the back of the wearer H and be coupled to the second side of the first rotary member 100 located at the first side of the second rotary member 200 to be rotatable relative to the first rotating axis R1.

Particularly, the first side of the second rotary member 200 can be coupled to the second side of the first rotary member 100 to be rotatable relative to the first rotating axis R1 extending from the back of the wearer H in the side direction of the wearer H, and when the second rotary member 200 rotates relative to the first rotating axis R1 at the first side thereof, the second side of the second rotary member 200 moves in the lateral direction and the upward and downward directions at the same time.

The first rotating axis R1 is rotated by the rotation of the first rotary member 100 between the front and rear and left and right directions on a plane parallel to the ground. The rotation center of the upper arm of the wearer H rotating relative to the shoulder may be located at the rotating axis (the first rotating axis R1) rotating relative to the first side of the second rotary member 200.

The first connecting part 300 may be coupled to the second rotary member 200 at the first side thereof to be rotatable relative to the second rotating axis R2, and may be coupled to the third rotary member 400 at the second side of the first connecting part 300 to be rotatable relative to the third rotating axis R3. The second rotating axis R2 and the third rotating axis R3 may be spaced apart from each other side by side.

The third rotary member 400 can rotate relative to the second rotary member 200 via the first connecting part 300. Particularly, the third rotary member 400 can rotate relative to the second rotary member 200 while rotating on its axis.

The first connecting part 300 extends laterally and forward from the second rotary member 200 located at a rear surface of the upper arm of the wearer H, and the second side of the first connecting part 300 and the third rotary member 400 may be located at the outer side surface of the upper arm of the wearer H.

In addition, the third rotary member 400 extends along an extending direction of the upper arm of the wearer H, and the second side of the third rotary member 400 may extend to the elbow located between the upper arm and the forearm of the wearer H.

The fourth rotating axis R4 of the fourth rotary member 500 rotating relative to the first side thereof may be rotated by the third rotary member 400. The fourth rotating axis R4 extends in a direction intersecting with the outer side surface of the upper arm of the wearer H, and particularly, may extend in a direction passing through the wearer H from the outer surface of the upper arm of the wearer H.

The first side of the fourth rotary member 500 is located at the elbow located between the upper arm and the forearm of the wearer H, and the rotation axis of the elbow, at which the rotation center of the forearm is located, may correspond to the fourth rotating axis R4.

The fourth rotary member 500 may extend along the longitudinal direction of the forearm from the outer surface or the rear surface of the forearm of the wearer H to the wrist or hand of the wearer H. The fourth rotary member 500 may be coupled to the upper arm, the forearm, or the hand of the wearer H, and particularly, may be coupled to the hand of the wearer H at the second side of the fourth rotary member 500.

In addition, the fixing member 600 may slide between the first side and the second side thereof in the upward and downward directions.

The fixing member 600 includes a plurality of members slidably coupled to each other, and as the plurality of members slide each other, the length between the first side and the second side of the fixing member 600 may be changed.

Accordingly, the first side of the fixing member 600 fixed to the fixture provided at the second side thereof may be changed in an up and down height by sliding. Accordingly, a different shoulder height of each wearer H or change in a shoulder height according to change in posture of a wearer H can be compensated. Particularly, when the elevation or depression of the shoulder of the wearer H is performed with the wearer H wearing the wearable apparatus for assisting muscular strength, the elevation or depression can be simulated.

Figure 2A:
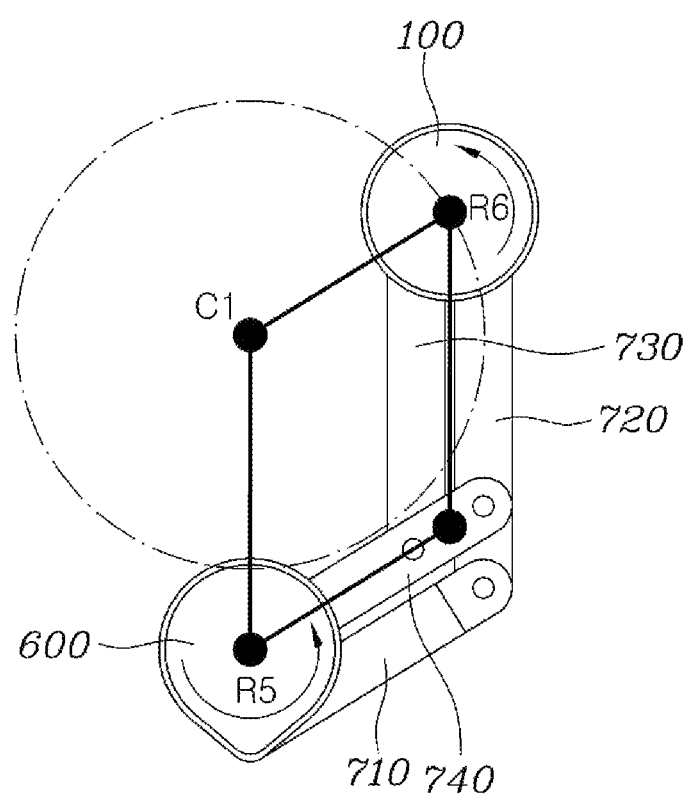
FIGS. 2A, 2B, and 2C illustrate rotating states of a first rotary member according to the embodiment of the present disclosure relative to a fixing member.
Figure 2B:
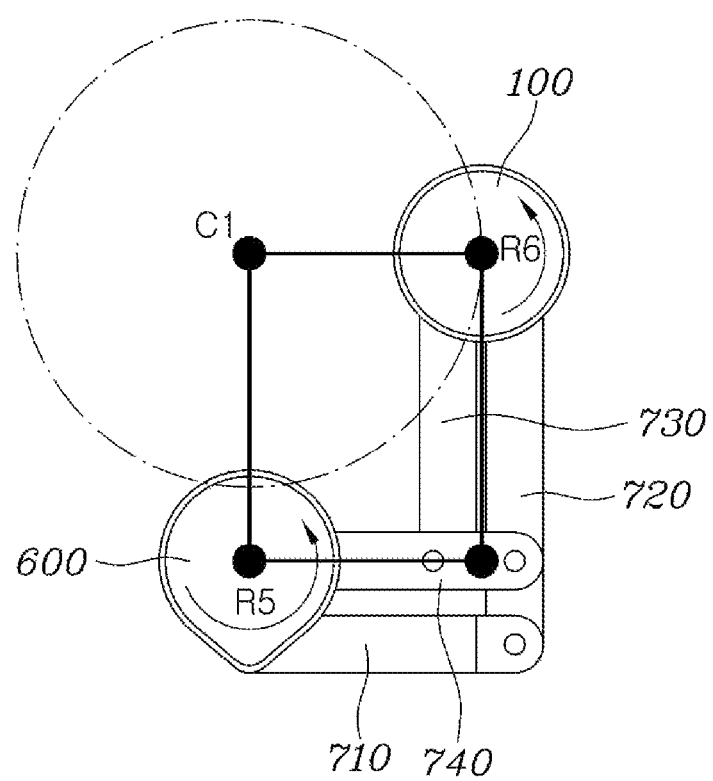
Figure 2C:
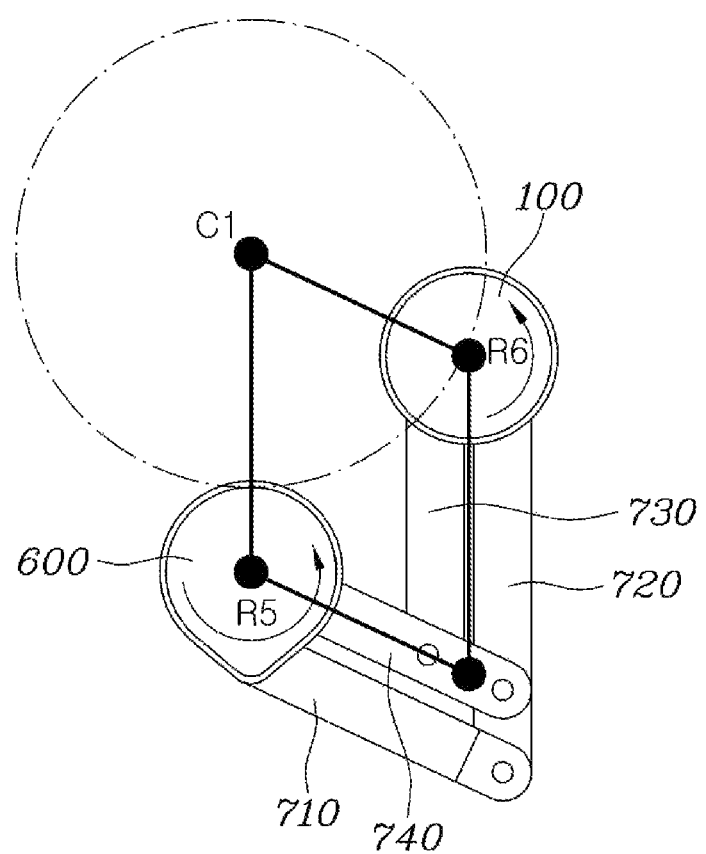

FIGS. 2A to 2C illustrate rotating states of the first rotary member 100 according to the embodiment of the present disclosure relative to a fixing member 600.

Referring to FIGS. 2A to 2C, the first rotary member 100 is coupled to the fixing member 600 via the second connecting part 700 to be rotatable relative to the fixing member 600, a rotation center C1 of the first rotary member 100 being located to be spaced apart forward from the fixing member 600 or the fifth rotating axis R5.

The rotation center C1 may be fixed as illustrated in the drawings, but may be continuously moved by the rotation of the second connecting part 700 according to another embodiment.

The first side of the first rotary member 100 is coupled to the second side of the second connecting part 700 to be rotatable relative to the sixth rotating axis R6, so the first rotary member 100 can rotate. Furthermore, the first rotary member 100 can rotate relative to the fixing member 600 via the second connecting part 700.

The second connecting part 700 may be configured as a plurality of members, and the plurality of members may form a 4 bar member structure provided by being spaced apart from each other side by side. The first rotary member 100 may be coupled to the fixing member 600 via the second connecting part 700 and rotate relative to the fixing member 600, and the rotation center C1 of the first rotary member 100 may be located to be spaced apart forward from the fixing member 600 or the fifth rotating axis R5 of the first side of the second connecting part 700 rotating relative to the first side of the fixing member 600.

Particularly, the rotation center C1, relative to which the first rotary member 100 rotates, may be located in the front of the fixing member 600 located at the back of the wearer H so as to be located inside the torso of the wearer H. Accordingly, the limit of a skeleton device can be overcome and the protraction or retraction motion of the wearer H by the clavicle rotation thereof can be naturally simulated.

Specifically, the second connecting part 700 may include: a first connecting member 710 rotatably coupled to the first side of the fixing member 600 and extending laterally; and a second connecting member 720 rotatably coupled to each of the first connecting member 710 and the first side of the first rotary member 100 and extending forward.

The first connecting member 710 and the second connecting member 720 rotate in a state bending to each other, so the second side of the second connecting part 700 and the first side of the first rotary member 100 may move forward and laterally relative to the fixing member 600.

Specifically, the length of the second connecting member 720 may extend to be longer than the length of the first connecting member 710.

The first connecting member 710 is configured to extend in the left and right directions of the wearer, and the second connecting member 720 is configured to extend in the front and rear directions of the wearer. That is, the first connecting member 710, which is relatively short, may extend laterally from the fixing member 600, and the second connecting member 720, which is relatively long, may extend forward from the first connecting member 710. Accordingly, the skeleton of the human body and the movement thereof can be naturally simulated. Generally, the length of the left and right directions is shorter than the length of the front and back directions from the fixing member 600 to the rotation center of the shoulder of the wearer.

Particularly, the second connecting member 720 coupled to the first rotary member 100 is required to be designed to have a length by a distance from the rotation center C1 of the first rotary member 100 to the wearer's shoulder. The length of the second connecting member 720 is required to be longer than the length of the first connecting member 710 such that the wearer has sufficient space to adjust the position of the wearable apparatus in consideration of the physique.

Furthermore, the second connecting part 700 may further include a third connecting member 730 rotatably coupled to the first side of the first rotary member 100 at a position spaced apart from the second connecting member 720 and extending in parallel with the second connecting member 720; and a fourth connecting member 740 coupled to the first side of the fixing member 600 at a position spaced apart from the first connecting member 710 and extending in parallel with the first connecting member 710, the fourth connecting member 740 being rotatably coupled to each of the second connecting member 720 and the third connecting member 730.

The first connecting member 710 and the fourth connecting member 740 may laterally form a four bar member by being spaced apart from each other in parallel with each other, and the second connecting member 720 and the third connecting member 730 may form a four bar member forward by being spaced apart from each other in parallel with each other.

Particularly, the first side of the fourth connecting member 740 may be rotatably coupled to the center of the fixing member 600, and the second side of the fourth connecting member 740, which extends laterally, can form a four bar member by being rotatably coupled to each of the second connecting member 720 and the third connecting member 730.

The second connecting member 720 can form a four bar member by being rotatably coupled to each of the first connecting member 710 and the fourth connecting member 740.

Accordingly, the first rotary member 100 rotates relative to the fixing member 600 and is stably supported by the second connecting part 700. Accordingly, the protraction or retraction motion of the shoulder of the wearer H can be naturally simulated.

Figure 3A:
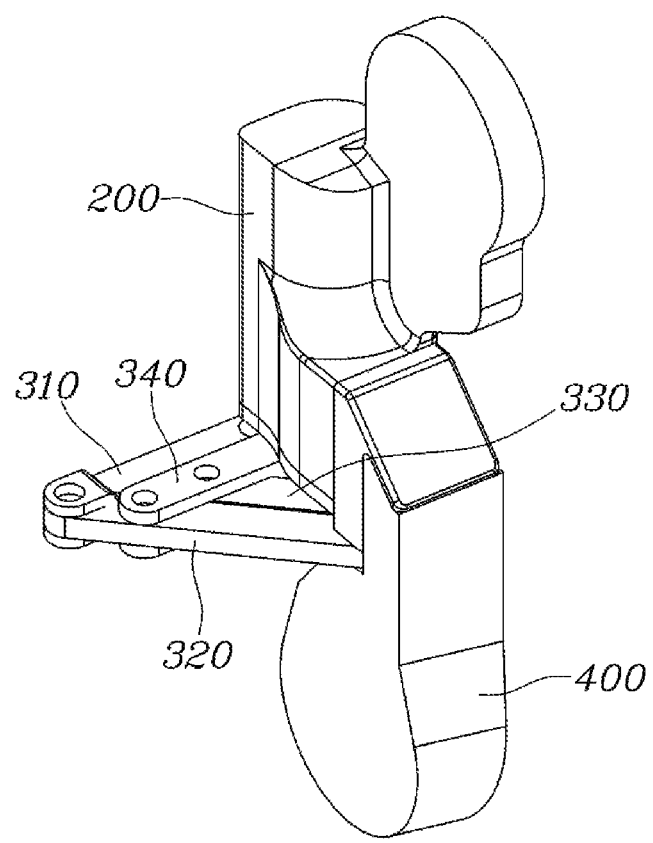
FIGS. 3A and 3B illustrate rotating states of a third rotary member according to the embodiment of the present disclosure relative to a second rotary member.
Figure 3B:
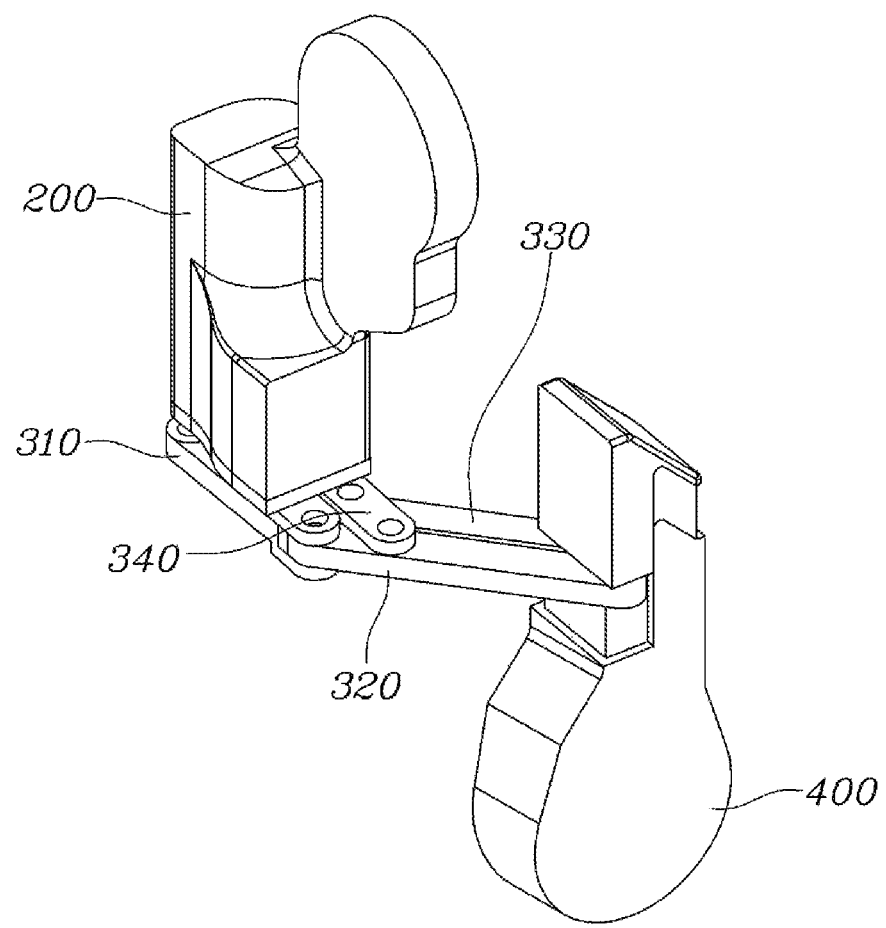

FIGS. 3A and 3B illustrate rotating states of the third rotary member 400 according to the embodiment of the present disclosure relative to a second rotary member 200.

Referring to FIGS. 3A and 3B, the third rotary member 400 is coupled to the second rotary member 200 via the first connecting part 300 to be rotatable relative to the second rotary member 200, a rotation center of the third rotary member 400 being located to be spaced apart forward from the second rotary member 200 or the second rotating axis R2.

A first side of the third rotary member 400 is rotatably coupled to the second side of the first connecting part 300, so the third rotary member 400 can rotate and, at the same time, rotate relative to the second rotary member 200. The rotation center of the third rotary member 400 rotating relative to the second rotary member 200 may be located inside the upper arm of the wearer H. Accordingly, the rotation center of the third rotary member 400 is located in the front of the second rotary member 200 and the second rotating axis R2 of the upper arm located at the back of the wearer H, so the limit of the skeleton device is overcome and the internal and external rotations of the wearer H are accurately simulated.

Specifically, the first connecting part 300 may include: a fifth connecting member 310 rotatably coupled to the second side of the second rotary member 200 and extending from the rear surface of the upper arm of the wearer H; and a sixth connecting member 320 rotatably coupled to each of the fifth connecting member 310 and the first side of the third rotary member 400 and extending forward.

The fifth connecting member 310 may extend to the outer side from the rear surface of the upper arm of the wearer H at the second side of the second rotary member 200, and the sixth connecting member 320 may extend forward along an outer surface of the upper arm of the wearer H from the fifth connecting member 310.

Accordingly, while the fifth connecting member 310 and the sixth connecting member 320 rotate, the third rotary member 400 may move forward and to the outer side relative to the second rotary member 200.

Specifically, the length of the sixth connecting member 320 may extend to be longer than the length of the fifth connecting member 310.

The fifth connecting member 310 is configured to extend in the left and right directions of the wearer, and the sixth connecting member 320 is configured to extend in the front and rear directions of the wearer. That is, the fifth connecting member 310, which is a relatively short, may extend laterally from the second side of the second rotary member 200, and the sixth connecting member 320, which is relatively long, may extend forward from the fifth connecting member 310. Accordingly, the skeleton of a human body and the motion of the skeleton can be naturally simulated.

In addition, the first connecting part 300 may further include: a seventh connecting member 330 rotatably coupled to the first side of the third rotary member 400 at a position spaced apart from the sixth connecting member 320 and extending in parallel with the sixth connecting member 320; and an eighth connecting member 340 coupled to the second side of the second rotary member 200 at a position spaced apart from the fifth connecting member 310 and extending in parallel with the fifth connecting member 310, the eighth connecting member 340 being rotatably coupled to each of the sixth connecting member 320 and the seventh connecting member 330.

The seventh connecting member 330 extends in parallel with the sixth connecting member 320 and be rotatably coupled to the third rotary member 400 by being spaced apart from the sixth connecting member 320.

The eighth connecting member 340 extends in parallel with the fifth connecting member 310 by being spaced apart from the fifth connecting member 310 and is rotatably coupled to each of the sixth connecting member 320 and the seventh connecting member 330.

That is, each of the sixth connecting member 320 and the seventh connecting member 330 is rotatably coupled to the eighth connecting member 340 to form a four bar member, and each of the fifth connecting member 310 and the eighth connecting member 340 is rotatably coupled to the sixth connecting member 320 to form a four bar member.

Accordingly, the external rotation or internal rotation of the upper arm of the wearer H can be naturally and stably simulated.

The third rotary member 400 is configured to be slidable in a longitudinal direction extending between the first side and the second side.

The third rotary member 400 extends along a longitudinal direction of the upper arm of the wearer H, and includes a plurality of members capable of sliding by being separated from each other between the first side and second side of the third rotary member 400, so the length of the third rotary member 400 can be changed.

The fourth rotary member 500 is configured to be slidable in a longitudinal direction extending between the first side and the second side thereof.

The fourth rotary member 500 extends along a longitudinal direction of the forearm of the wearer H, and includes a plurality of members capable of sliding by being separated from each other between the first side and second side of the fourth rotary member 500, so the length of the fourth rotary member 500 can be changed.

Particularly, the second side of the third rotary member 400 and the first side of the fourth rotary member 500 are rotatable relative to the fourth rotating axis R4, and the lengths of the third rotary member 400 and the fourth rotary member 500 may be changed such that the fourth rotating axis R4 corresponds to a rotation center of the forearm rotating relative to the upper arm of the wearer H.

A grip part 510 configured to be gripped by a hand of the wearer H is provided in the fourth rotary member 500, so that the wearer H is coupled to the fourth rotary member 500 by gripping the grip part 510 by the hand.

As illustrated in FIG. 1, the grip part 510 may extend from the second side of the fourth rotary member 500 in a direction perpendicular to the hand of the wearer H. The grip part 510 extends in a direction perpendicular to a longitudinal direction of the hand of the wearer H, so the wearer H can easily grip the grip part 510 by the hand.

According to another embodiment, the grip part 510 may extend in a direction parallel with the extending direction of the fourth rotary member 500.

The grip part 510 may be rotatably coupled to the second side of the fourth rotary member 500 relative to a seventh rotating axis R7 extending in the extending direction of the fourth rotary member 500.

The seventh rotating axis R7 extends along the extending direction of the fourth rotary member 500 or the longitudinal direction of the forearm of the wearer H, and the grip part

510 may be coupled to the second side of the fourth rotary member 500 to be rotatable relative to the seventh rotating axis R7.

As the grip part 510 rotates relative to the second side of the fourth rotary member 500, the rotation of the wrist of the wearer H can be simulated.

In some embodiments, the first, second, third, and fourth rotary members may comprise links, rods, cylinders, and other similar connectors.

Although the present disclosure was described with reference to the specific embodiment shown in the drawings, it is apparent to those skilled in the art that the present disclosure may be changed and modified in various ways without departing from the scope of the present disclosure, which is described in the following claims.

The invention claimed is:

1. A wearable apparatus for assisting muscular strength, the wearable apparatus comprising:
    a first rotary member, a first side of which is located at an upper portion of a shoulder of a wearer, which bends downward while extending in a rear direction of the wearer, and a second side of which is located at a back of the wearer;
    a second rotary member, a first side of which is coupled to the second side of the first rotary member to be rotatable relative to a first rotating axis extending from the back of the wearer to a side of the wearer, extending along an extending direction of an upper arm of the wearer, and a second side of which moves upward and downward during rotation of the second rotary member relative to the first side thereof;
    a first connecting part, a first side of which is coupled to the second side of the second rotary member to be rotatable relative to a second rotating axis extending in the extending direction of the upper arm of the wearer, and a second side of which is located at an outer side surface of the wearer by extending in a direction of a plane intersecting with the second rotating axis; and
    a third rotary member, a first side of which is coupled to the second side of the first connecting part to be rotatable relative to a third rotating axis extending in a direction parallel with the second rotating axis, the third rotary member extending along the extending direction of the upper arm from the outer side surface of the wearer.

2. The wearable apparatus of claim 1, further comprising:
    a fixing member located at the back of the wearer and extending in the upward and downward directions; and
    a second connecting part coupled to each of a first side of the fixing member and the first side of the first rotary member to be rotatable relative to each of a fifth rotating axis and a sixth rotating axis extending in the upward and downward directions at the first side of the fixing member and the first side of the first rotary member, respectively.

3. The wearable apparatus of claim 2, wherein the fixing member is configured to be slidable between the first side and the second side thereof in the upward and downward directions.

4. The wearable apparatus of claim 2, wherein the first rotary member is coupled to the fixing member via the second connecting part to be rotatable relative to the fixing member, a rotation center of the first rotary member being located to be spaced apart forward from the fixing member or the fifth rotating axis.

5. The wearable apparatus of claim 2, wherein the second connecting part comprises:
    a first connecting member rotatably coupled to the first side of the fixing member and extending laterally, and
    a second connecting member rotatably coupled to each of the first connecting member and the first side of the first rotary member and extending forward.

6. The wearable apparatus of claim 5, wherein the second connecting member extends to be longer than the first connecting member.

7. The wearable apparatus of claim 5, wherein: the second connecting part further comprises:
    a third connecting member rotatably coupled to the first side of the first rotary member at a position spaced apart from the second connecting member and extending in parallel with the second connecting member; and
    a fourth connecting member coupled to the first side of the fixing member at a position spaced apart from the first connecting member and extending in parallel with the first connecting member, the fourth connecting member being rotatably coupled to each of the second connecting member and the third connecting member.

8. The wearable apparatus of claim 1, wherein the third rotary member is coupled to the second rotary member via the first connecting part to be rotatable relative to the second rotary member, a rotation center of the third rotary member being located to be spaced apart forward from the second rotary member or the second rotating axis.

9. The wearable apparatus of claim 1, wherein the first connecting part comprises:
    a fifth connecting member rotatably coupled to the second side of the second rotary member and extending from a rear surface of the upper arm of the wearer; and
    a sixth connecting member rotatably coupled to each of the fifth connecting member and the first side of the third rotary member and extending forward.

10. The wearable apparatus of claim 9, wherein the sixth connecting member extends to be longer than the fifth connecting member.

11. The wearable apparatus of claim 9, wherein the first connecting part further comprises:
    a seventh connecting member rotatably coupled to the first side of the third rotary member at a position spaced apart from the sixth connecting member and extending in parallel with the sixth connecting member; and
    an eighth connecting member coupled to the second side of the second rotary member at a position spaced apart from the fifth connecting member and extending in parallel with the fifth connecting member, the eighth connecting member being rotatably coupled to each of the sixth connecting member and the seventh connecting member.

12. The wearable apparatus of claim 1, wherein the third rotary member is configured to be slidable in a longitudinal direction extending between the first side and the second side thereof.

13. The wearable apparatus of claim 1, further comprising a fourth rotary member, a first side of which is coupled to the second side of the third rotary member to be rotatable relative to a fourth rotating axis extending in a direction intersecting with an outer side surface of the upper arm of the wearer, the fourth rotary member extending in an extending direction of a forearm of the wearer and being coupled to the upper arm, the forearm, or a hand of the wearer.

14. The wearable apparatus of claim 13, wherein the fourth rotary member is configured to be slidable in a longitudinal direction extending between the first side and the second side thereof.

15. The wearable apparatus of claim 13, wherein a grip part configured to be gripped by the hand of the wearer is provided in the fourth rotary member, so that the wearer is connected to the fourth rotary member by gripping the grip part.

16. The wearable apparatus of claim 15, wherein the grip part is coupled to a second side of the fourth rotary member to be rotatable relative to a seventh rotating axis extending in an extending direction of the fourth rotary member.

* * * * *